United States Patent
Hebbar et al.

(10) Patent No.: US 7,486,468 B2
(45) Date of Patent: Feb. 3, 2009

(54) CORRECTED READ/WRITE OFFSET COMPENSATION

(75) Inventors: Ravi Hebbar, Longmont, CO (US); Justin Won, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/747,008

(22) Filed: May 10, 2007

(65) Prior Publication Data

US 2008/0278842 A1 Nov. 13, 2008

(51) Int. Cl.
*G11B 21/02* (2006.01)
(52) U.S. Cl. .......................................... 360/75
(58) Field of Classification Search ........................ None
See application file for complete search history.

(56) References Cited

U.S. PATENT DOCUMENTS

| 6,493,173 | B1* | 12/2002 | Kim et al. ................. | 360/77.04 |
| 6,671,119 | B2* | 12/2003 | Baumann et al. .......... | 360/77.08 |
| 7,027,256 | B1* | 4/2006 | Subrahmanyam et al. ....................... | 360/77.08 |
| 7,054,096 | B1* | 5/2006 | Sun et al. .................. | 360/77.04 |
| 7,106,547 | B1* | 9/2006 | Hargarten et al. ......... | 360/77.04 |
| 7,304,819 | B1* | 12/2007 | Melkote et al. ........... | 360/77.04 |

* cited by examiner

*Primary Examiner*—K. Wong
(74) *Attorney, Agent, or Firm*—Myers Bigel Sibley & Sajovec

(57) ABSTRACT

A read trajectory and/or a write trajectory of a read/write head of a rotatable disk drive is adjusted using a compensation signal that compensates for a time-varying difference between the read trajectory and the write trajectory.

20 Claims, 7 Drawing Sheets

CORRECTED READ/WRITE OFFSET COMPENSATION

BACKGROUND

The present invention generally relates to servo systems and, more particularly, to compensating read/write offsets in a servo control system.

Computer disk drives store information on disks or platters. Typically, the information is stored on each disk in concentric tracks. The data tracks are usually divided into sectors. Information is written to and read from a storage surface(s) of a disk by a transducer. The transducer may include a read element separate from a write element, or the read and write elements may be integrated into a single read/write element. The transducer is mounted on an actuator arm capable of moving the transducer radially over the disk. Accordingly, the movement of the actuator arm allows the transducer to access different data tracks.

The disk is rotated by a spindle motor at a high speed, allowing the transducer to access different sectors within each track on the disk. The actuator arm is coupled to a motor or coarse actuator, such as a voice coil motor (VCM), to move the actuator arm such that the transducer moves radially over the disk. Operation of the coarse actuator is controlled by a servo control system. The servo control system generally performs two distinct functions: seek control and track following. The seek control function includes controllably moving the actuator arm such that the transducer is moved from an initial position to a target track position.

In general, the seek function is initiated when a host computer associated with the disk drive issues a command to read data from or write data to a target track on the disk. Once the transducer has been moved sufficiently close to the target track by the seek function of the control system, the track following function of the servo control system is activated to center and maintain the transducer on the target track until the desired data transfers are completed.

The track following function of the servo control system generally includes maintaining the transducer at a desired position with respect to a track being followed (e.g., over a centerline of the track). Typically, the transducer must be moved slightly during track following to maintain a desired position over the track. This is because, due to various factors, the track may appear to move beneath the transducer. There are numerous outside influences which can make it difficult for the servo control system to maintain the desired position over the track, one such influence is known as "runout."

Runout generally refers to deviation from perfect circular motion and, more particularly, refers to variation in the distance between an external point of reference and a passing surface of a rotating object. "Repeatable runout" involves periodic deviations that occur with predictable regularity (hereafter "RRO"). "Nonrepeatable runout" involves random perturbations due, for example, to bearing slop, shock events, and so on (hereafter NRRO). In the context of a disk drive, RRO is "repeatable" because it occurs in sync with the spinning disk. RRO may be caused by one or more of the following mechanical sources: a) spindle motor runout; b) disk slippage; c) disk warping; and d) disturbances converted to RRO during a servo writing process due to, for example, NRRO, vibrations, resonances, media defects, or disk distortion due to clamping of the disk. RRO may also be caused by electromagnetic imperfections due to low quality servo positioning bursts, even if they were mechanically recorded on the ideal circle. Such low quality servo positioning bursts can yield incorrect position information.

In an ideal disk drive system, the tracks of the data storage disk are written as non-perturbed circles situated about the center of the disk. As such, each of these ideal tracks includes a track centerline that is located at a known constant radius from the disk center. In an actual system, however, it is difficult to write non-perturbed circular tracks to the data storage disk. That is, due to the problems mentioned above (e.g., vibration, bearing defects, etc.), tracks are generally written differently from the ideal non-perturbed circular track shape.

In order to reduce problems associated with track misplacement, disk drive manufacturers have developed techniques to determine the track misplacement, so that compensation values (also known as embedded runout correction values or ERC values) may be generated and used to position the transducer along an ideal track centerline.

SUMMARY

According to some embodiments, a read trajectory and/or a write trajectory of a read/write head of a rotatable disk drive is adjusted using a compensation signal that compensates for a time-varying difference between the read trajectory and the write trajectory.

A disk drive according to some embodiments includes a rotatable data storage disk including a data storage surface and a track defined on the data storage surface, and an actuator arm including a read/write head positioned thereon. The read/write head includes a read element and a write element, and the actuator arm positions the read/write head over the data storage surface. The disk drive includes a controller that controls a motion of the actuator arm to move the read/write head on a read trajectory during a read operation and on a write trajectory during a write operation, and that adjusts the read trajectory and/or the write trajectory using a compensation signal that compensates for a time-varying difference between the read trajectory and the write trajectory.

DETAILED DESCRIPTION

The present invention now will be described more fully hereinafter with reference to the accompanying drawings, in which various embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings of the present invention.

The present invention may be embodied in hardware (analog and/or discrete) and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
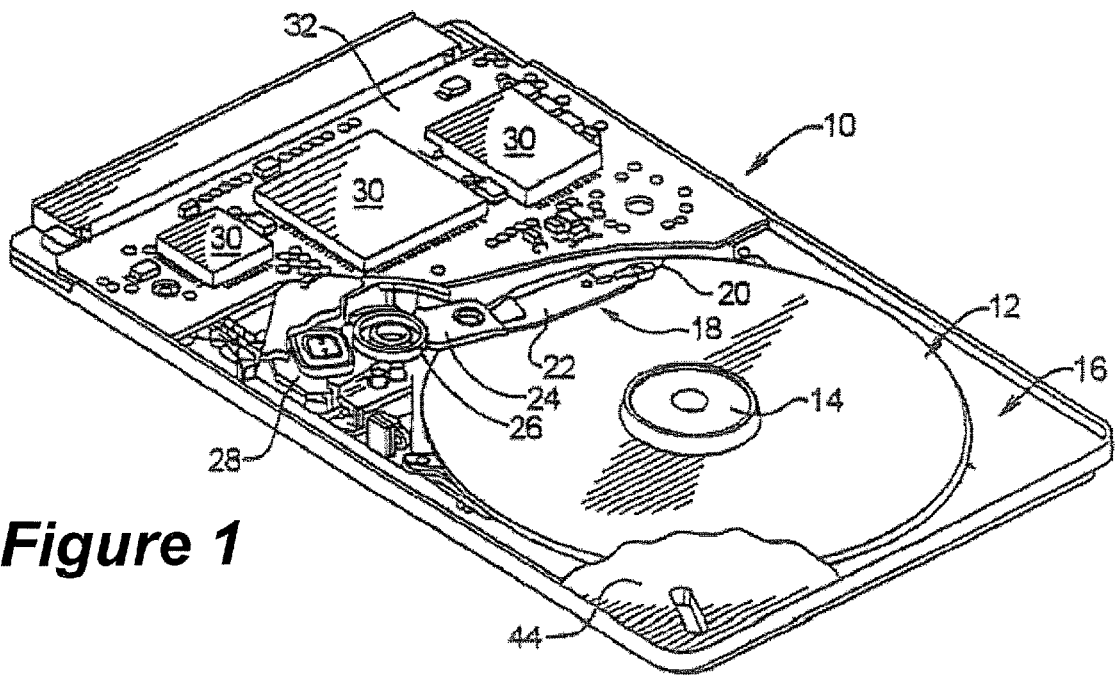
FIG. 1 is a perspective view of a disk drive in accordance with some embodiments.
Figure 2:
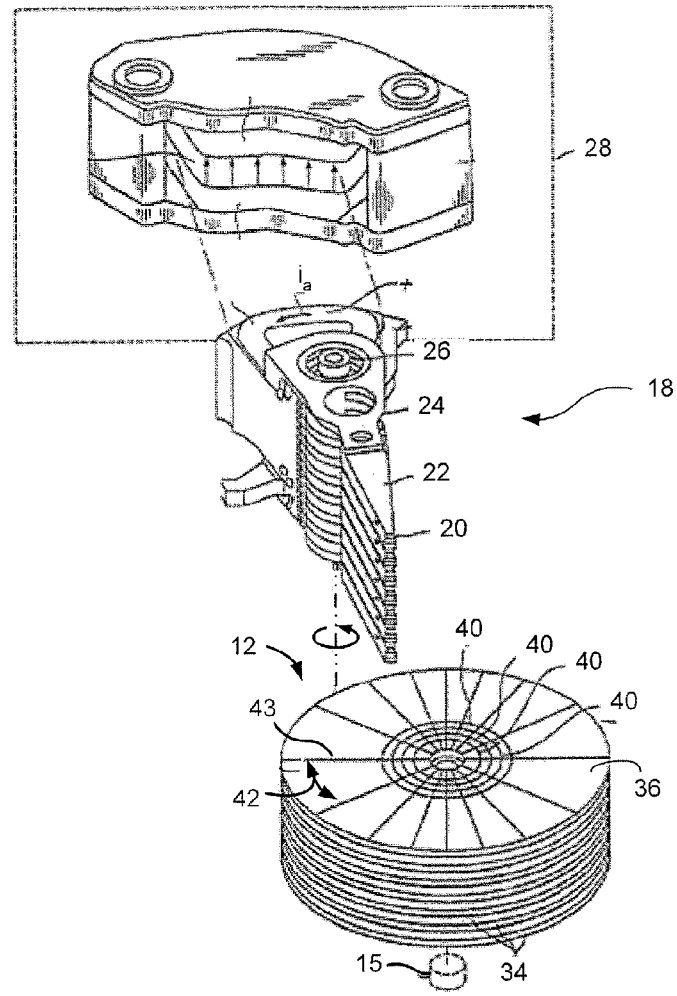
FIG. 2 is an exploded perspective diagram of a disk stack having a plurality of data storage disks along with an actuator assembly.

A simplified diagrammatic representation of a disk drive, generally designated as 10, is illustrated in FIG. 1. The disk drive 10 includes a disk stack 12 (illustrated as a single disk in FIG. 1) that is rotated about a hub 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 15.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks 40 and spokes 43 on the disks 34. Data is stored on the disks 34 within a number of concentric tracks 40 (or cylinders). Each track 40 is divided into a plurality of sectors 42 separated by radially extending spokes 43. Each sector 42 is further divided into a servo sector 42a and a data sector 42b. The servo sectors of the disks 34 are used, among other things, to accurately position the head 20 so that data can be properly written onto and read from a selected one of the disks 34. The data sectors are where non-servo related data (i.e., host device data) is stored and retrieved.

Figure 3:
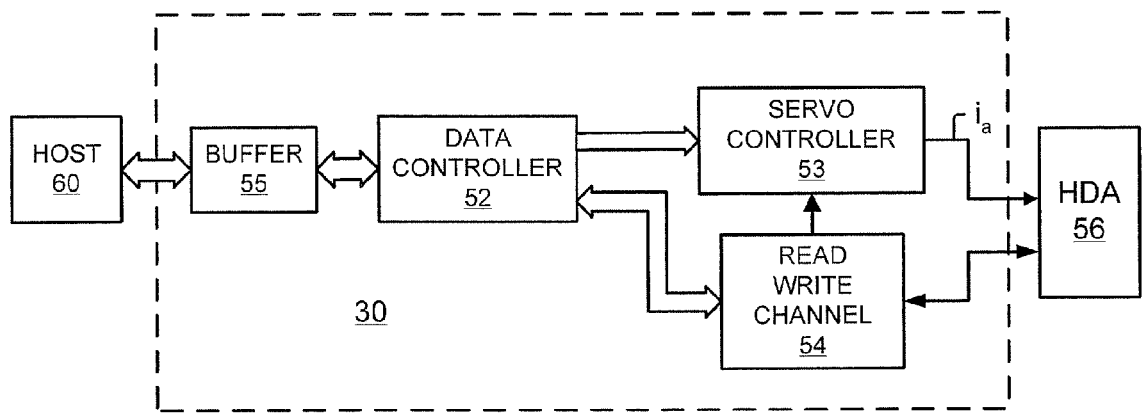
FIG. 3 is a block diagram of a portion of the controller of the disk drive shown in FIG. 1 and associated methods.

FIG. 3 is a block diagram of a host device 60 that is communicatively connected to a portion of the controller 30 of the disk drive 10 shown in FIG. 1 according to some embodiments. The controller 30 can include a data controller 52, a servo controller 53, a read write channel 54, and a buffer 55. Although the controllers 52, 53, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34, a plurality of the heads 20 mounted to the actuator arm assembly 18 and positioned adjacent to different data storage surfaces of the disks 34, the VCM 28, and the spindle motor 15.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form conducted through the heads 20 in the HDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34 by applying an actuator current signal $i_a$ to the VCM 28, and to maintain the head 20 aligned with the track while data is written/read on the disk 34.

Figure 4:
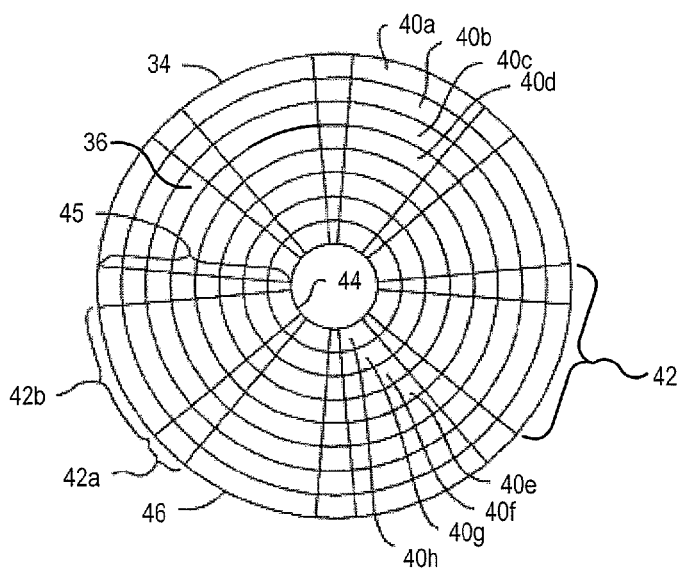
FIG. 4 is a plan view of a disk including a plurality of tracks including servo sectors and data sectors.

FIG. 4 is a simplified diagrammatic representation of a top view of a disk 34 having a surface 36 which has been completely formatted to be used in conjunction with a sectored servo system (also known as an embedded servo system). As illustrated in FIG. 3, the disk 34 includes a plurality of concentric tracks 40a-40h for storing data on the disk's surface 36. Although FIG. 4 only shows a relatively small number of tracks for ease of illustration, it should be appreciated that typically tens of thousands of tracks are included on the surface 36 of a disk 34.

Each track 40a-40h is divided into a plurality of servo sectors 42a and a plurality of data sectors 42b. The servo sectors 42a in each track 40 are radially aligned with servo sectors 42a in the other tracks, thereby forming servo wedges 45 which extend radially across the disk 34 (e.g., from the disk's inner diameter 44 to its outer diameter 46).

When the tracks 40a-40h are defined on the disk surface 36, an effort is made to form the tracks to be perfectly circular about a center of the disk 34. Moreover, an effort is made to ensure that when the disk 34 is mounted onto the spindle hub 14, the center of the disk 34 is aligned directly over the center of the hub 14.

However, when the servo information is written ex-situ, for example, by a pack-writer, and the disks 34 are assembled in the drives 10, the disks may end up being eccentric with respect to the spindle center. Even though an index mark, such as a laser index mark, may be used to bias the disks on both the pack-writer and in the drive 10, the disk center and the spindle center may not align perfectly.

Furthermore, even if the servo information is written in-situ, such that the disk center and spindle center coincide perfectly, a shock event can lead to disk-slip, which in turn may render the disks eccentric with respect to the spindle center. At higher eccentricities, the trajectory, or path, traveled by the write element of the read/write head 20 may be slightly different from the trajectory of the read element. This is due to finite offset, or distance, between the read element and the write element of the head 20, which results in a time-varying difference between the read and write trajectories, as illustrated in FIGS. 5A to 5D, which are Off-Track Capability (OTC) plots of a conventional disk drive having different amounts of eccentricity between the disk center and the spindle center. Since the time-varying difference in trajectories has a period that is the same as the rotational period of the disk 34, the time-varying difference is referred to as a "1× signature." The 1× signature may lead to a degraded bit error rate (BER).

Figure 5A:
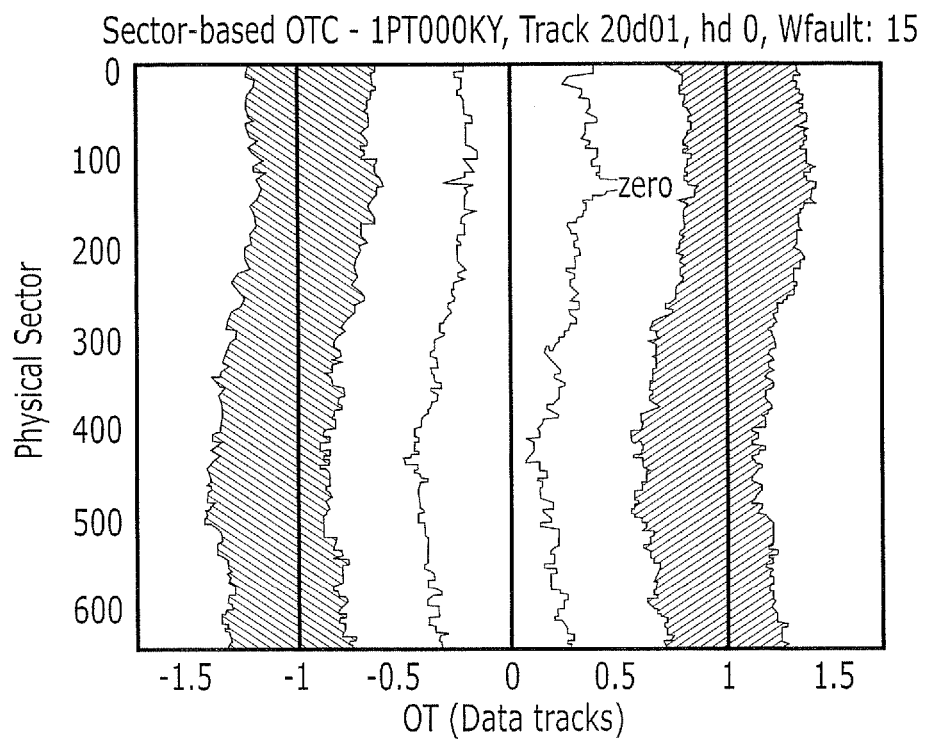
FIGS. 5A to 5D are graphs of OTC before compensation correction.
Figure 5B:
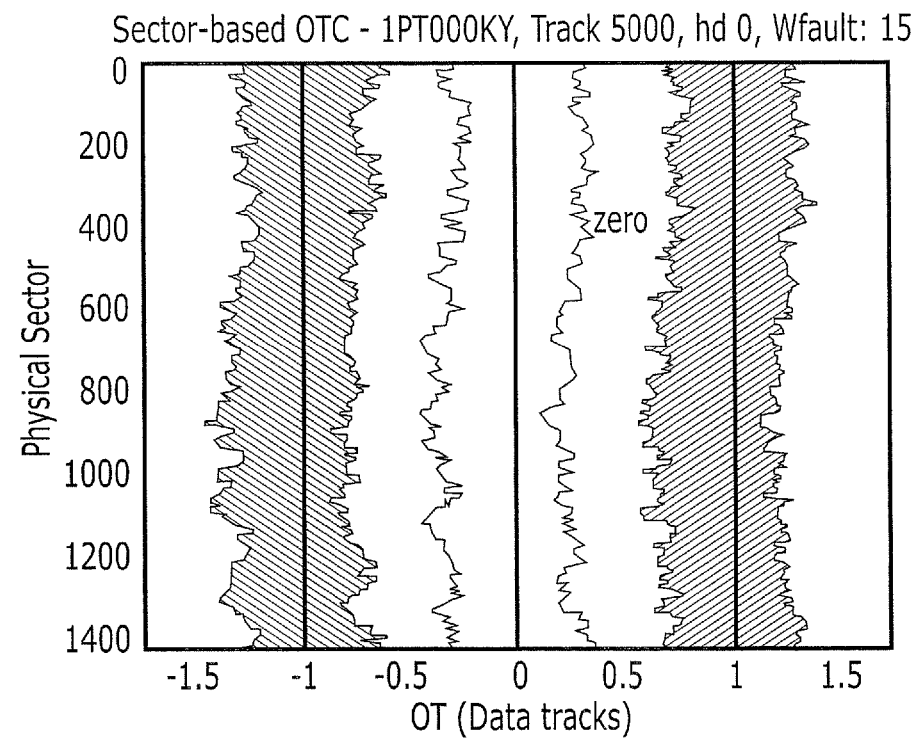
Figure 5C:
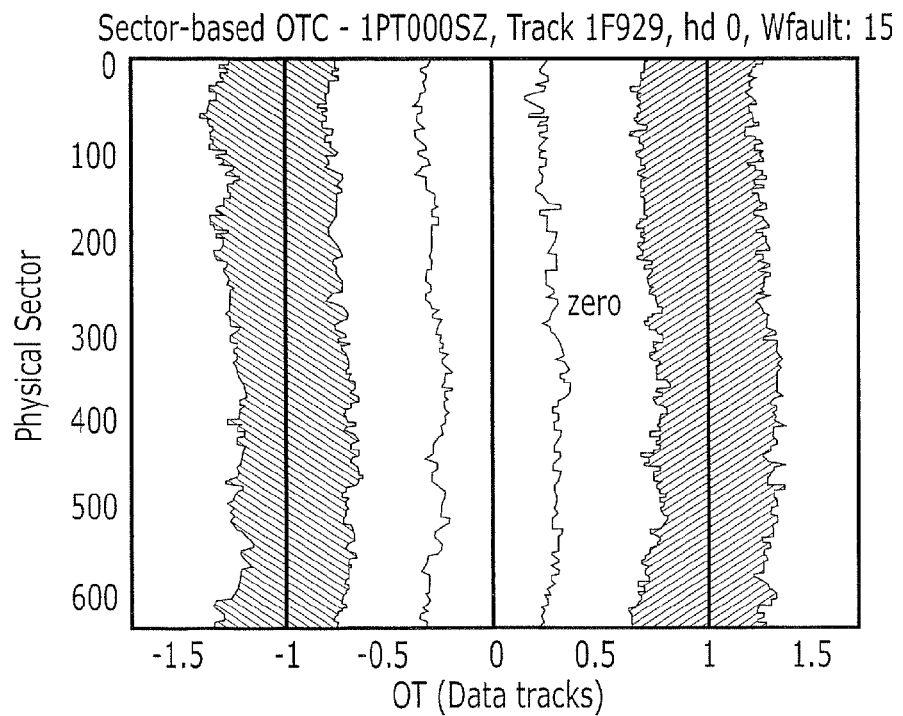
Figure 5D:
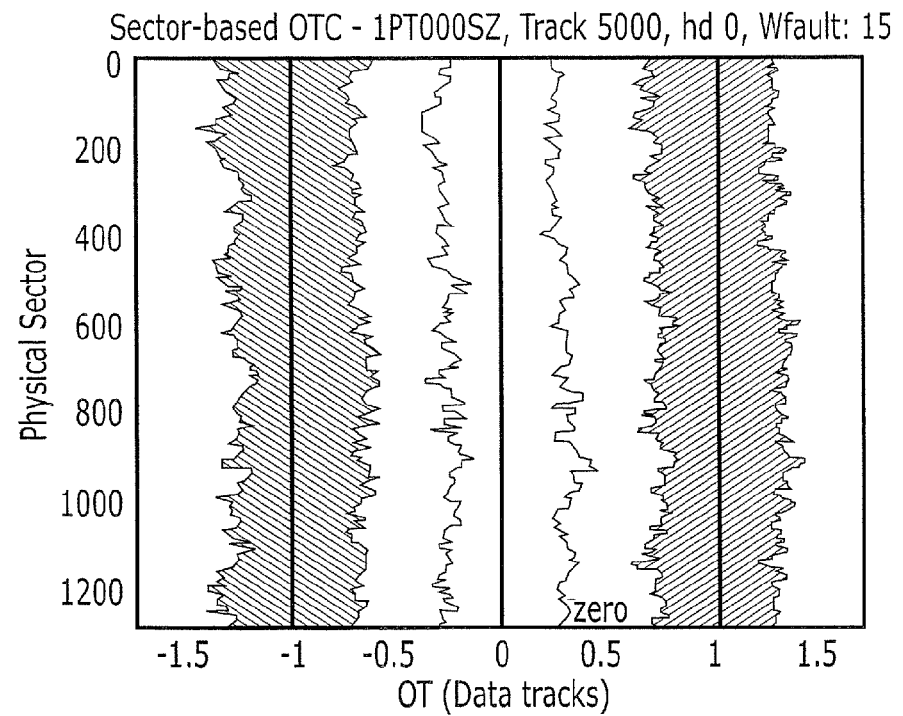

FIGS. 5A and 5B are OTC plots at the inner diameter (ID) and outer diameter (OD), respectively, on a disk drive having 1800 μinches of eccentricity. FIGS. 5C and 5D are OTC plots at the ID and OD, respectively, on a drive having 800 μinches of eccentricity. In FIGS. 5A to 5D, the track position is plotted on the x-axis for three different tracks, and the sector, or disk position, is plotted on the y-axis.

As can seen from FIGS. 5A to 5D, the magnitude of the 1× signature is related to the magnitude of the eccentricity. For example, compare the magnitude of the 1× signal in FIG. 5A (1800 μinches of eccentricity) versus the magnitude of the 1× signal in FIG. 5C (800 μinches of eccentricity). Furthermore, the 1× signature appears to be coherent across the surface of the disk. The applicants have discovered that the 1× signature arises at least in part as a result of the head geometry. Accordingly, some embodiments obtain a compensation signal based on head geometry that can be applied during a read operation to reduce or eliminate the effect of the 1× signature.

Figure 6:
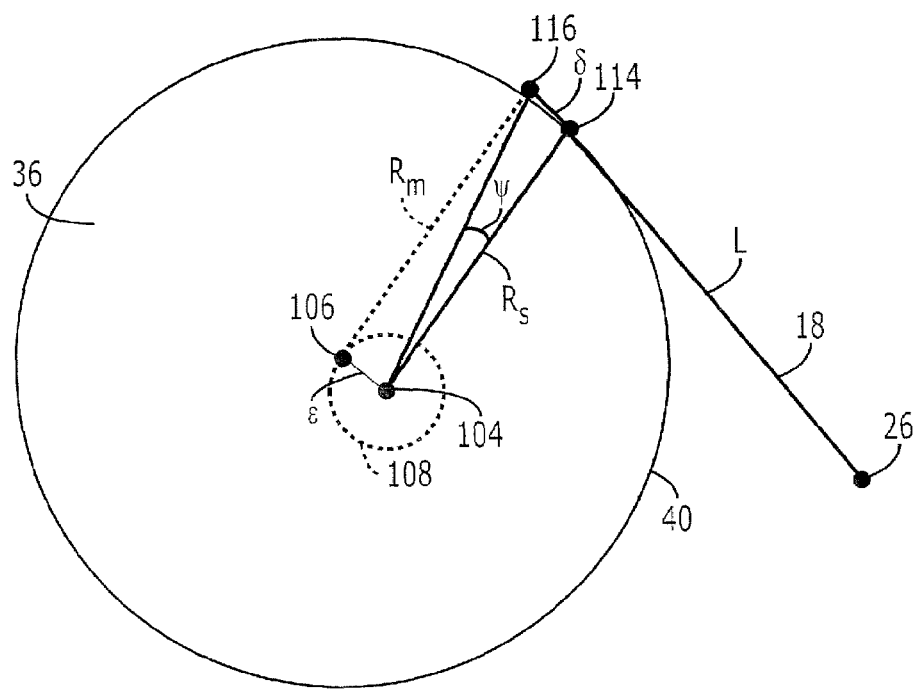
FIG. 6 is a schematic diagram of a disk and an actuator arm.

FIG. 6 is a schematic diagram of a disk surface 36 and an actuator arm 18 including a read element 114 and a write element 116. In particular, FIG. 6 shows the locations of the read element 114 and the write element 116 relative to a track 40 on the disk surface 36. The disk has a geometric center 106 that is offset from a spindle center 104 about which the disk rotates. As the disk rotates about the spindle center, the actual disk center 106 travels in a circle 108 around the spindle center 104. The distance between the spindle center 104 and the geometric center 106 defines the eccentricity ε of the disk.

The radius of the track 40 with respect to the disk center 106 is designated as $R_m$, and the radius of the track 40 with respect to the spindle center 104 is designated as $R_s$. The actuator arm 18 pivots around the pivot bearing 26. The pivot-to-gap distance L is the distance from the pivot bearing 26 to the read element 114. The offset between the read element and the write element is denoted as δ, and the angular offset between the read element and the write element is denoted as Ψ.

If the eccentricity is zero, i.e. the disk center 106 is coincident with the spindle center 104 so that ε=0, the write element 116 writes at a constant (DC) radial offset from the read element (relative to the disk center 106) as the disk rotates. This offset, sometimes referred to as the MR offset, may vary as the actuator arm 18 sweeps across the disk surface 36, but will be constant for a given track 40. Furthermore, there may be a track, referred to as the zero-skew track or zero MR offset track, where both the read element 114 and the write element 116 are positioned at the same distance from the disk center 106. However, when the disk eccentricity ε is non-zero, the offset δ between the read element 114 and the write element 116 will vary as the disk rotates. This may result in a 1× difference between the trajectories of the read element 114 and the write element 116 on top of the DC offset. The DC offset may be eliminated by conventional MR offset compensation techniques. The residual 1× signature may remain after DC compensation, however, as is evidenced by the OTC plots of FIGS. 5A to 5D.

The reader trajectory can be written as:

$$R_T(t) = \epsilon \sin(\omega t + \phi) \quad (1)$$

where ω is the once-around frequency in rad/sec, and ε and φ are the magnitude and phase of the eccentricity.

The 1× component arises due to two effects, both of which are related to the finite eccentricity and finite offset δ between the read element 114 and the write element 116. First, since the write element 116 is located at an offset d from the read element 114, the amplitude of the sinusoid followed by the write element 116 is different from the sinusoid followed by the read element 114, as given by equation (2):

$$\epsilon' = \epsilon(1 + \delta/L) \quad (2)$$

where δ is the reader-writer offset, and L is the actuator pivot to gap distance. Second, due to the angular separation Ψ of the read element 114 and the write element 116, the data is written at an angular offset of $\psi \approx \delta/R_s$. However, since the eccentricity ε is much smaller than the radius of the ID data track, the following approximation can be made:

$$R_s \approx R_m \quad (3)$$

Neglecting the DC term, the trajectory of the write element 116 can thus be written as:

$$W_T(t) = \epsilon' \sin(\omega t + \phi + \psi) \quad (4)$$

where $$\epsilon' = \epsilon(1+\delta/L) \quad (5)$$

and $$\psi \approx \delta/R_m \quad (6)$$

Figure 7:
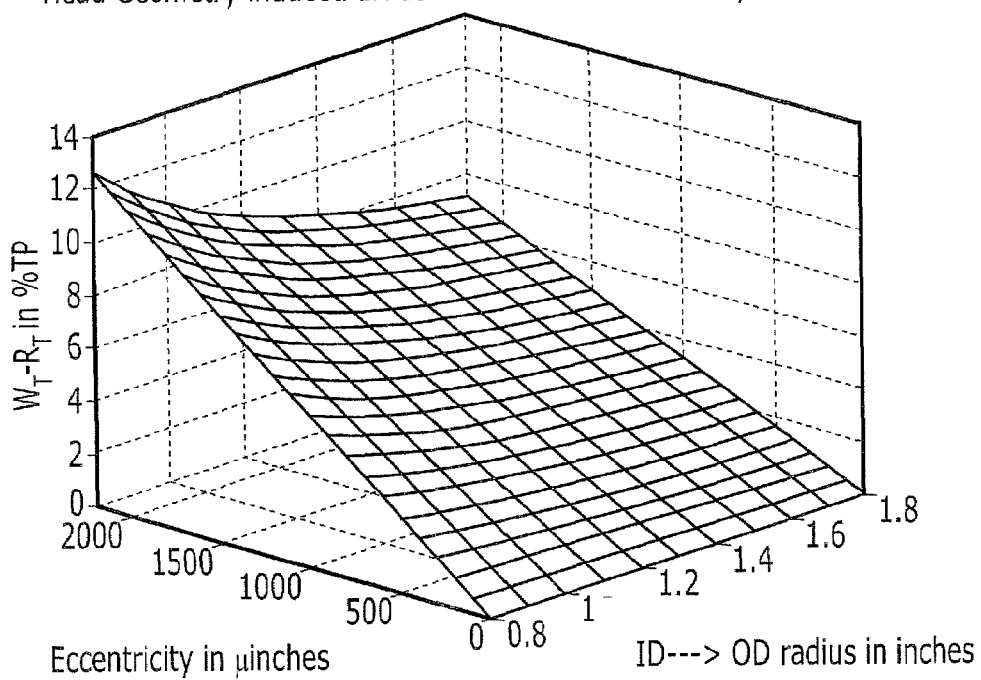
FIG. 7 is a graph illustrating the effects of eccentricity and track radius on a 1× signature.

The magnitude of the 1× component as a function of eccentricity and the radius of the track is plotted in FIG. 7. As shown therein, the magnitude of the 1× component increases proportionally with eccentricity and is inversely proportional to the radius of the track.

To reduce or eliminate the 1× component between the trajectories of the read element 114 and the write element 116, it is possible according to some embodiments to change the reference during either the read operation (or the write operation) to match the trajectory of the write element 116 (or the read element 114). A compensation signal C(t) that can be applied by the servo controller 53 (FIG. 3) during the read operation is as follows:

$$C(t) = W_T(t) - R_T(t) = \epsilon' \sin(\omega t + \phi + \psi) - \epsilon \sin(\omega t + \phi) \quad (7)$$

$$C(t) = \epsilon' \sin(\omega t)(\cos\phi\cos\psi - \sin\phi\sin\psi) + \epsilon'\cos(\omega t)(\sin\phi\cos\psi + \cos\phi\sin\psi) - \epsilon\sin(\omega t)\cos\phi - \epsilon\cos(\omega t)\sin\phi \quad (8)$$

Similarly, a compensation signal C(t) that can be applied by the servo controller 53 during the write operation can have the form:

$$C(t) = R_T(t) - W_T(t) = \epsilon \sin(\omega t + \phi) - \epsilon' \sin(\omega t + \phi + \psi) \quad (9)$$

By making the small angle approximation, equation (9) can be rewritten as follows:

$$C(t) \approx \epsilon' \sin(\omega t)\cos\phi - \epsilon'\psi \sin(\omega t)\sin\phi + \epsilon'\cos(\omega t)\sin\phi + \epsilon'\psi\cos(\omega t)\cos\phi - \epsilon\sin(\omega t)\cos\phi - \epsilon\cos(\omega t)\sin\phi \quad (10)$$

After regrouping the terms, equation (10) can be rewritten as follows:

$$C(t) = (\epsilon' - \epsilon)\sin(\omega t)\cos\phi + (\epsilon' - \epsilon)\cos(\omega t)\sin\phi - \epsilon'\psi\sin(\omega t)\sin\phi + \epsilon'\psi\cos(\omega t)\cos\phi \quad (11)$$

Substituting $\delta/L$ for $\epsilon' - \epsilon$, $\delta/R_m$ for $\psi$, and making the approximation $\epsilon' \approx \epsilon$, equation (11) can be rewritten as follows:

$$C(t) \approx \frac{\epsilon\delta}{L}\sin(\omega t)\cos\phi + \frac{\epsilon\delta}{L}\cos(\omega t)\sin\phi - \frac{\epsilon\delta}{R_m}\sin(\omega t)\sin\phi + \frac{\epsilon\delta}{R_m}\cos(\omega t)\cos\phi \quad (12)$$

In discrete time, the compensation signal C(nT) for sector n can be written as:

$$C(nT) \approx \left(\epsilon\cos\phi\frac{\delta}{L} - \epsilon\sin\phi\frac{\delta}{R_m}\right)\sin(\omega nT) + \left(\epsilon\sin\phi\frac{\delta}{L} + \epsilon\cos\phi\frac{\delta}{R_m}\right)\cos(\omega nT) \quad (13)$$

The term $\delta/L$ is a constant for a product family. The term $\delta/R_m$ can be calculated at the initiation of a seek based on the destination track. Thus, it will be appreciated that the compensation signal C(t) can be expressed in terms of quantities that are known and/or can be determined.

Further, $\epsilon\cos\phi$ and $\epsilon\sin\phi$ are the sine and cosine coefficients of the feed-forward compensation (AFC) signal that helps to compensate for repeatable runout due to eccentricity. Thus, the compensation signal for sector n can be written as:

$$C(nT) \approx \left(AFC_{\sin}\frac{\delta}{L} - AFC_{\cos}\frac{\delta}{R_m}\right)\sin(\omega nT) + \left(AFC_{\cos}\frac{\delta}{L} + AFC_{\sin}\frac{\delta}{R_m}\right)\cos(\omega nT) \quad (14)$$

The compensation signal for a given track may be stored, for example, in servo information for the track, in a data sector, or elsewhere on the disk. In particular, the compensation signal may be used to adjust embedded runout correction (ERC) values stored for the track that are used to generate a compensated trajectory for a write operation and/or a read operation on the track. In other embodiments, the compensation signal can be generated in real time and used to adjust the write trajectory and/or the read trajectory along with ERC values stored in the track.

Figure 8A:
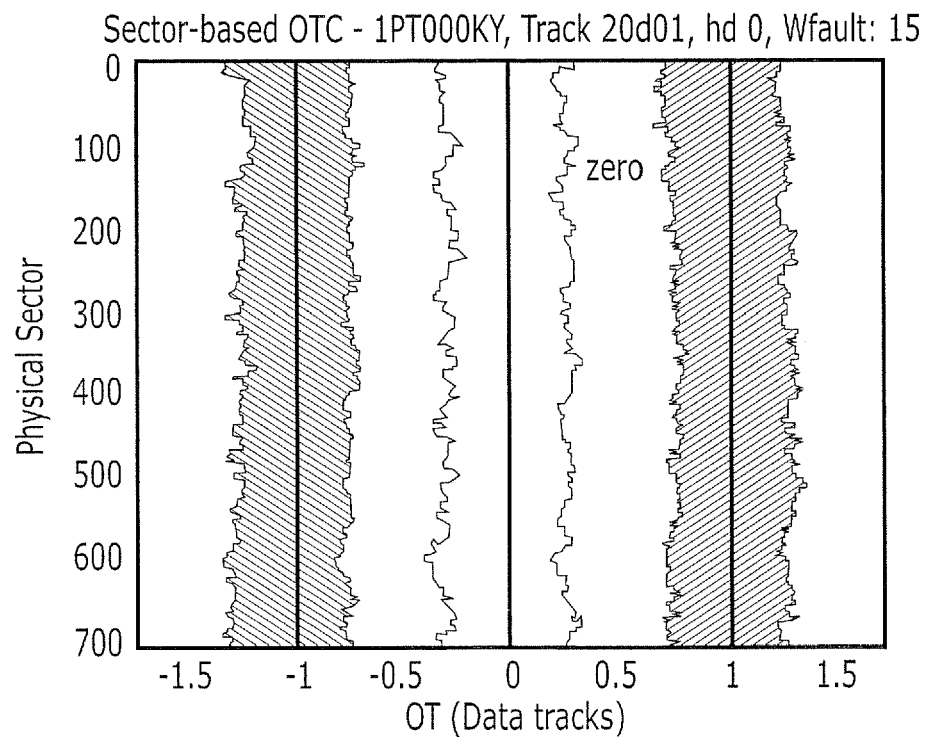
FIGS. 8A to 8D are graphs of OTC after compensation correction according to some embodiments.
Figure 8B:
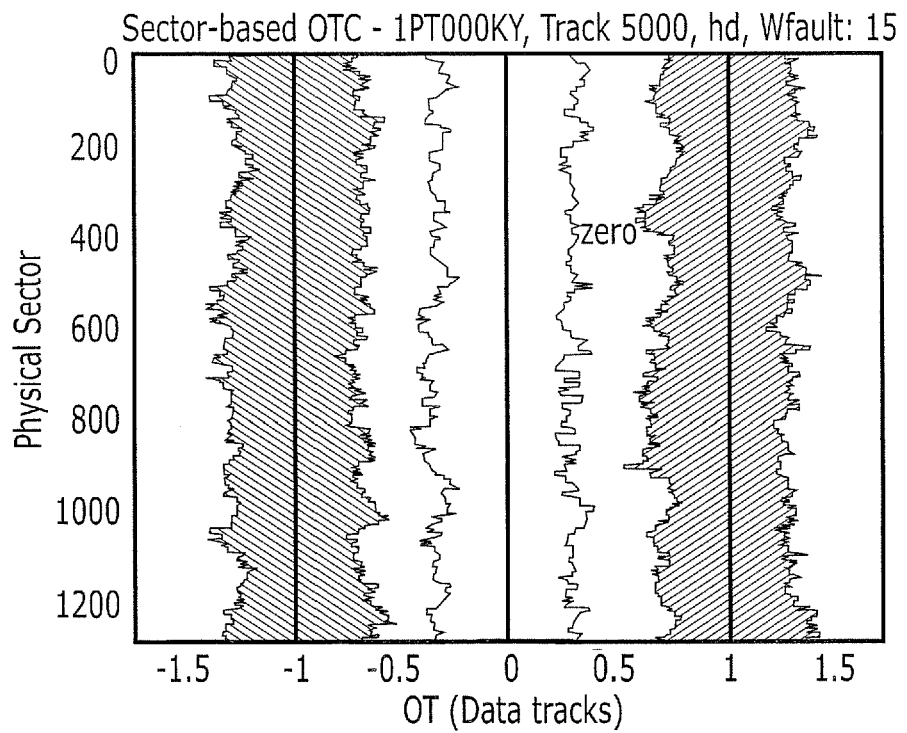
Figure 8C:
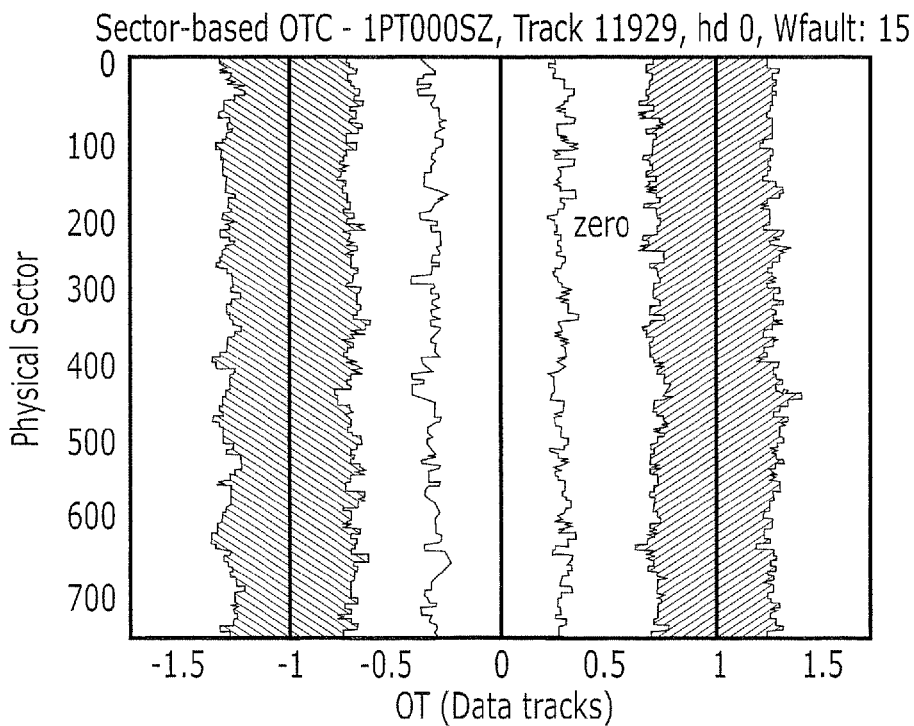
Figure 8D:
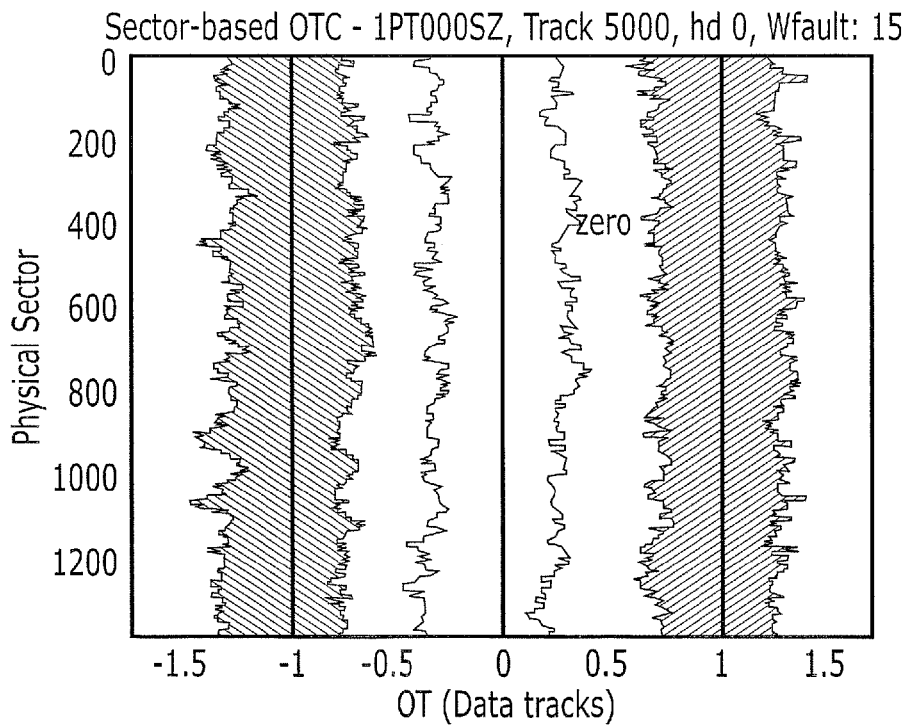

A compensation scheme as described above was implemented on a disk drive having an eccentricity of 1800 μinches and on a disk drive having an eccentricity of 800 μinches. Off-track capability (OTC) measurements of the drives are shown in FIGS. 8A to 8D. FIGS. 8A and 8B show the off-track capability at the inner diameter (ID) and the outer diameter (OD), respectively, of the disk drive having an eccentricity of 1800 μinches, after applying a compensation signal as described above. Similarly, FIGS. 8C and 8D show the off-track capability at the ID and OD, respectively, of the disk drive having an eccentricity of 800 μinches, after applying the compensation signal. The 1× signature evident in FIGS. 5A to 5D has been notably reduced or eliminated from each of the plots in FIGS. 8A to 8D.

As noted above, when a disk center is not precisely aligned with the spindle center, there can be a significant 1× component between the trajectories of the read element and the write element of a read/write head of the disk drive. Furthermore, the 1× component varies in direct proportion with the eccentricity and in inverse proportion to the radius of the track. According to some embodiments, a compensation signal is defined that can be applied to the read trajectory to reduce and/or eliminate the 1× component and thus read the data along the center of the data track. In some embodiments, a corresponding compensation signal could be applied to the write trajectory and/or complementary compensation signals could be applied to both the read trajectory and the write trajectory in order to reduce and/or eliminate the 1× component.

The resulting improvement in bit error rate (BER) may improve yield at a given eccentricity specification, and/or may enable a disk drive to tolerate higher eccentricity specifications, potentially resulting in significant yield improvements in a manufacturing environment.

In the drawings and specification, there have been disclosed typical preferred embodiments and, although specific terms are employed, they are used in a generic and descriptive sense only and not for purposes of limitation, the scope being set forth in the following claims.

What is claimed is:

1. A disk drive comprising:
   a rotatable data storage disk including a data storage surface and a track defined on the data storage surface;
   an actuator arm including a read/write head positioned thereon, the read/write head including a read element and a write element, wherein the actuator arm positions the read/write head over the data storage surface;
   a controller that controls motion of the actuator arm to move the read/write head on a read trajectory during a read operation and on a write trajectory during a write operation, and that adjusts the read trajectory and/or the write trajectory using a compensation signal that compensates for a time-varying difference between the read trajectory and the write trajectory.

2. The disk drive of claim 1, further comprising:
   a disk spindle having a spindle center, wherein the rotatable data storage disk is mounted on the disk spindle, and wherein the disk has a disk center that is misaligned to the spindle center;
   a pivot bearing, wherein the actuator arm extends from the pivot bearing and is rotatable about the pivot bearing, wherein the read element is displaced from the pivot bearing, and wherein the write element is displaced from the read element; and
   an actuator motor that is coupled to the actuator arm and that rotates the actuator arm about the pivot bearing to position the read/write head over the track;
   wherein the controller controls the motion of the actuator arm by controlling an actuator current signal supplied to the actuator motor.

3. The disk drive of claim 2, wherein the disk center is misaligned to the disk spindle by a disk eccentricity $\epsilon$, the read element is displaced from a center of the pivot bearing by a distance L, the track has a radius $R_m$ relative to the disk center, and the write element is displaced from the read element by a displacement $\delta$, and wherein the compensation signal is generated in response to the eccentricity $\epsilon$, the distance L, the radius $R_m$, and the displacement $\delta$.

4. The disk drive of claim 3, wherein the compensation signal adjusts the read trajectory and has the form:

$$C(nT) \approx \left(\varepsilon\cos\phi\frac{\delta}{L} - \varepsilon\sin\phi\frac{\delta}{R_m}\right)\sin(\omega nT) + \left(\varepsilon\sin\phi\frac{\delta}{L} + \varepsilon\cos\phi\frac{\delta}{R_m}\right)\cos(\omega nT)$$

wherein $\omega$ represents an angular frequency of rotation of the disk, n is a sector number and T is a discrete time interval.

5. The disk drive of claim 3, wherein the write trajectory has the form:

$$W_T(t)=\epsilon' \sin(\omega t+\phi+\psi)$$

wherein $\omega$ represents an angular frequency of rotation of the disk, $\phi$ represents a phase of an eccentricity between the disk center and the spindle center, $\psi$ represents an angular offset between the read element and the write element relative to the spindle center, and $$\epsilon'=\epsilon(1+\delta/L).$$

6. The disk drive of claim 5, wherein the read trajectory has the form:

$$R_T(t)=\epsilon \sin(\omega t+\phi).$$

7. The disk drive of claim 6, wherein the compensation signal adjusts the read trajectory and has the form:

$$C(t)=W_T(t)-R_T(t)=\epsilon' \sin(\omega t+\phi+\psi)-\epsilon \sin(\omega t+\phi).$$

8. The disk drive of claim 6, wherein the compensation signal adjusts the write trajectory and has the form:

$$C(t)=R_T(t)-W_T(t)=\epsilon \sin(\omega t+\phi)-\epsilon' \sin(\omega t+\phi+\psi).$$

9. A rotatable data storage disk comprising:
   a data storage surface; and
   a plurality of embedded runout correction (ERC) values stored on the data storage surface, the ERC values including compensation signal values that compensate a read trajectory and/or a write trajectory of a read/write head during a read operation and/or a write operation on the data storage surface that compensate for a time-varying difference between the read trajectory and the write trajectory.

10. The disk of claim 9, wherein the compensation signal values adjust the read trajectory and have the form:

$$C(t)=W_T(t)-R_T(t)$$

wherein $W_T(t)$ represents an uncompensated write trajectory and $R_T(t)$ represents an uncompensated read trajectory.

11. The disk of claim 9, wherein the ERC values are stored in a servo sector on the data storage surface.

12. The disk of claim 9, wherein the ERC values are stored in a data sector on the data storage surface.

13. A method comprising:
    adjusting a read trajectory and/or a write trajectory of a read/write head using a compensation signal that compensates for a time-varying difference between the read trajectory and the write trajectory.

14. The method of claim 13, wherein the time-varying difference between the read trajectory and the write trajectory arises as a result of a physical configuration of a disk, a disk spindle on which the disk is mounted, an actuator arm, and a read/write head that is positioned over the disk by the actuator arm.

15. The method of claim 13, wherein the disk has a disk center that is misaligned to center of the disk spindle by a disk eccentricity $\epsilon$, the actuator arm pivots around a pivot bearing to position the read/write head over a track on the disk, the read/write head includes a read element that is displaced from a center of the pivot bearing by a distance L and a write element that is displaced from the read element by a displacement $\delta$, and the track has a radius $R_m$ relative to the disk center, the method further comprising generating the compensation signal in response to the eccentricity $\epsilon$, the distance L, the radius $R_m$, and the displacement $\delta$.

16. The method of claim 15, wherein the compensation signal adjusts the read trajectory and has the form:

$$C(nT) \approx \left(\varepsilon\cos\phi\frac{\delta}{L} - \varepsilon\sin\phi\frac{\delta}{R_m}\right)\sin(\omega nT) + \left(\varepsilon\sin\phi\frac{\delta}{L} + \varepsilon\cos\phi\frac{\delta}{R_m}\right)\cos(\omega nT)$$

wherein $\omega$ represents an angular frequency of rotation of the disk, n is a sector number and T is a discrete time interval.

17. The method of claim 15, wherein the write trajectory has the form:

$$W_T(t)=\epsilon' \sin(\omega t+\phi+\psi)$$

wherein $\omega$ represents an angular frequency of rotation of the disk, $\phi$ represents a phase of an eccentricity between the disk center and the center of the spindle, $\psi$ represents an angular offset between the read element and the write element relative to the center of the spindle, and $$\epsilon'=\epsilon(1+\delta/L).$$

18. The method of claim 17, wherein the read trajectory has the form:

$$R_T(t) = \epsilon \sin(\omega t + \phi).$$

19. The method of claim 18, wherein the compensation signal adjusts the read trajectory and has the form:

$$C(t) = W_T(t) - R_T(t) = \epsilon' \sin(\omega t + \phi + \psi) - \epsilon \sin(\omega t + \phi).$$

20. The method of claim 18, wherein the compensation signal adjusts the write trajectory and has the form:

$$C(t) = R_T(t) - W_T(t) = \epsilon \sin(\omega t + \phi) - \epsilon' \sin(\omega t + \phi + \psi).$$

* * * * *